Figure 1:
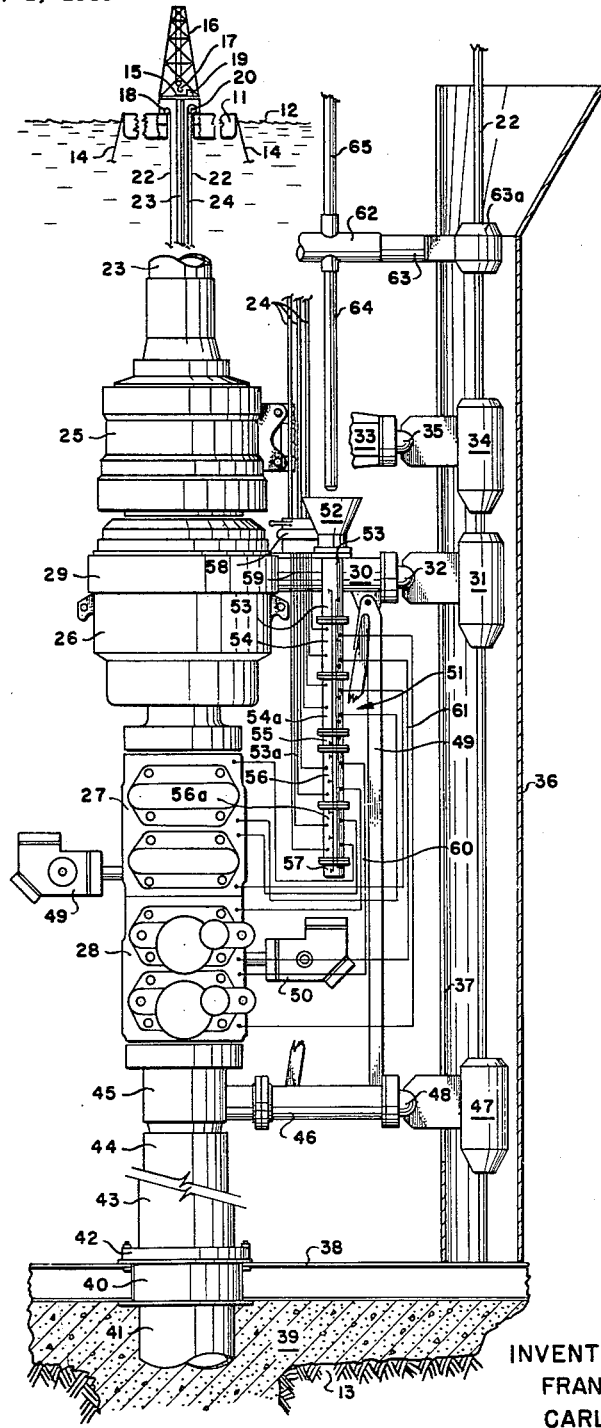

April 2, 1963  F. POORMAN, JR., ET AL  3,083,729
HYDRAULICALLY OPERATED MANIFOLD VALVE SYSTEM
Filed Dec. 1, 1960  6 Sheets-Sheet 1

INVENTORS:
FRANK POORMAN JR.
CARL W. LAFITTE
BY: J. H. McCarthy
THEIR AGENT

April 2, 1963 F. POORMAN, JR., ET AL 3,083,729
HYDRAULICALLY OPERATED MANIFOLD VALVE SYSTEM
Filed Dec. 1, 1960 6 Sheets-Sheet 2

INVENTORS:
FRANK POORMAN, JR.
CARL W. LAFITTE
BY: A. H. McCarthy
THEIR AGENT

INVENTORS:
FRANK POORMAN JR.
CARL W. LAFITTE
BY: A. H. McCarthy
THEIR AGENT

INVENTORS:
FRANK POORMAN JR.
CARL W. LAFITTE
BY: A. H. McCarthy
THEIR AGENT

INVENTORS:
FRANK POORMAN JR.
CARL W. LAFITTE

INVENTORS:
FRANK POORMAN JR
CARL W. LAFITTE
BY: J. H. McCarthy
THEIR AGENT

United States Patent Office 3,083,729
Patented Apr. 2, 1963

3,083,729
HYDRAULICALLY OPERATED MANIFOLD VALVE SYSTEM
Frank Poorman, Jr., Lafayette, La., and Carl W. Lafitte, Houston, Tex., assignors to Shell Oil Company, New York, N.Y., a corporation of Delaware
Filed Dec. 1, 1960, Ser. No. 73,163
4 Claims. (Cl. 137—620)

This invention relates to hydraulic systems and pertains more particularly to a hydraulic system for use with hydraulically-operated equipment on wellheads positioned at offshore locations in water of considerable depth where it is desired to re-establish control of hydraulical equipment whose normal hydraulic pressure supply lines have been damaged or destroyed.

In the field of drilling, completion and production of wells, such for example, as an oil well, various pieces of equipment are grouped and/or connected together and positioned at the top of the well. This assemblage of equipment is commonly known as a wellhead assembly, or more simply, a wellhead. The particular components of the wellhead assembly are determined by the operation being carried out at the time, the location of the well, and the conditions encountered for that particular well.

In the event that the well is being produced, the wellhead assembly would comprise various valves, pressure gauges, chokes, and the necessary spool pieces and/or other fittings necessary to connect these components together and mount them on the top of the well casing and tubing. The wellhead assembly for controlling the flow from a producing well is often known as a Christmas tree. The various components of a wellhead positioned on land are often manually operated so as to achieve the desired production from the well. However, where the wellhead is positioned underwater, such as close to the ocean floor, the various elements of the wellhead assembly are arranged for remote control by electrical, hydraulic or pneumatic systems, such for example as one described in U.S. patent application Serial No. 834,095, filed August 17, 1959, to Culver et al. and entitled "Wye-Branched Wellhead Assembly."

Entirely different wellhead components may be employed to control formation fluid while drilling, to permit circulation of fluid or cement out of the well, to connect various pieces of equipment in place, etc., when drilling wells in deep water at offshore locations wherein the wellhead is positioned on the ocean floor, as described in copending application, U.S. Serial No. 830,538, filed July 30, 1959, to Haeber et al., and entitled "Underwater Well Completion Method." While in most operations the wellhead assembly is usually fixedly secured to the top of a well casing extending down into the earth formation, it is to be realized that at underwater offshore locations the wellhead may alternatively be connected to a conductor pipe, a water string, a well casing, or any suitable platform positioned on the ocean floor through which a well is being drilled, as described in the last above identified patent application.

The hydraulic system of the present invention is suitable for use with many types of remotely-controlled hydraulically-operated apparatuses after the normal control lines to the apparatuses have been ruptured or damaged. One example of such an apparatus, where it is desired to remotely control various hydraulically-operated units, is a wellhead positioned on the ocean floor. Hence, the present invention will be described with regard to such an underwater wellhead apparatus for purposes of illustrating the present invention.

In the field of well drilling operations, the usual formation pressure control devices are normally called blowout preventers and side access valves. If a drilling wellhead is located in an inaccessible position, such as on the bottom of the ocean, these control devices are normally remotely-operated hydraulically or pneumatically through individual lines to each moving element of each device. Thus, two hydraulic pipes or hoses are usually required to operate each ram of a blowout preventer, or to operate the gate of a side access valve. In order to operate the various components of a drilling wellhead positioned underwater, anywhere from 10 to 20 or more hydraulic pipes or hoses may be needed to connect the various components to a source of pressure fluid which is normally contained on the drilling barge from which the well is being drilled.

At present, there is no system whereby control of a hydraulically-operated blowout preventer assembly or other hydraulically-operated units on a wellhead, positioned at the bottom of the ocean below diver depth, may be regained after losing use of the primary hydraulic pipes or hoses running between these hydraulic units and the source of pressure fluid on the barge. It is, therefore, a primary object of the present invention to provide a method and apparatus by which an operator positioned at a remote location may regain control and operate hydraulically-operated units to which the original hydraulic pressure conduits have been damaged.

A further object of the present invention is to provide an apparatus and method for use in well drilling operations of offshore locations by which an operator positioned on the surface of the water may regain control of and operate a blowout preventer assembly and other hydraulically-operated wellhead equipment positioned deep in the water and to which the original pressure fluid control lines have been lost.

Another object of the present invention is to provide a method and apparatus for regaining control of hydraulically-operated units on a production wellhead positioned underwater at offshore locations where primary hydraulic control of the units have been lost.

Still another object of the present invention is to provide a method and apparatus for closing off ruptured pressure lines to hydraulically-operated underwater wellhead units while regaining control of the units remotely by means of an auxiliary hydraulic system which is remotely connectible to the hydraulic units.

A still further object of the present invention is to provide a three-way hydraulic system for remotely controlling one or more hydraulically-operated elements.

These and other objects of the present invention will be understood from the following description taken with reference to the drawing, wherein:

FIGURE 1 is a diagrammatical view illustrating a floatable drilling barge anchored to the ocean floor over a drilling location with a drilling wellhead assembly being positioned on the ocean floor a considerable distance, say 400 feet, below the surface of the water;

FIGURES 2 through 6 inclusive are views taken in longitudinal cross-section of a re-entry hydraulic system including a manifold valve for use with the equipment of FIGURE 1.

Referring to FIGURE 1 of the drawing, a drilling barge 11, of any suitable floatable type is illustrated as floating on the surface of the water 12 and fixedly positioned over a preselected drilling location by being anchored to the ocean floor 13 by anchors (not shown) at the end of the anchor lines 14. Equipment of this type may be used when carrying out well drilling operations in water varying from about 100 feet to 1500 feet or more in depth. The barge 11 is equipped with a suitable derrick 16 provided with a traveling block 17 on fall lines as well as other auxiliary equipment needed during the drilling of a well such as guide line tensioning devices 18, a drilling control panel 19 for underwater blowout protection, reels 20 for the hydraulic pressure control lines 24, guide lines 22 for guiding equipment from the barge 11 to the ocean floor, and a marine conductor pipe 23 adapted to extend from the floatable barge 11 to wellhead equipment located on the ocean floor.

The lower end of the marine conductor 23 is provided with a marine conductor landing head 25 which is adapted to seat on a bag-type blowout preventer 26 which is in turn fixedly secured to the top of a pair of ram-type blowout preventers 27 and 28. The blowout preventers 26, 27 and 28 may be run as a composite package. In order to be able to run the blowout preventers down into place in accurate alignment on top of the wellhead assembly at the ocean floor, at least one of the blowout preventers, for example preventer 26, is provided with a mounting ring 29 from which extend two or more guide arms 30 having guide cones 31 secured to the outwardly extending ends of the arms 30 by means of swivel joints 32. In a like manner, the marine conductor landing head 25 is provided with guide arms 33 having guide cones 34 secured to the ends thereof by means of swivel joints 35.

The guide cones 31 and 34 are adapted to be readily mounted on the equipment guide lines 22 at the surface so that they encircle the guide and are slidably movable therealong. In FIGURE 1, the guide cones 31 and 34 are illustrated in a position after having traveled down the guide cables from the barge 11 into an aligned position within a hollow guide column 36 having a longitudinal slot 37 therein for aligning the cones. The vertical aligning columns 36 are rigidly secured, as by welding, to any suitable guide structure base 38 which is positioned on the ocean floor 13 and preferably fixedly anchored there by means of a pad of cement 39.

Fixedly secured to the guide structure base 38 and extending downwardly therefrom through a center ring 40 is a string of casing which may be secured in place as by a casing locking ring 42. A casinghead 43 extends upwardly from the wellhead base 38. The top 44 of the casinghead 43 forms the opening into which a lockdown connector may be seated. Both internal and external lock-down connectors may be used. The lockdown connector 45 is normally connected, by bolts, to the lowermost blowout preventer 28. The lock-down connector 45 is provided with guide arms 46 and guide cones 47 secured thereto by swivel joints 48. One blowout preventer 27 may be provided with a drilling control or a kill valve 49, while the other blowout preventer 28 is provided with a drilling control or choke valve 50.

Rigidly affixed to the wellhead assembly and preferably to the blowout preventer assembly comprising blowout preventers 26, 27 and 28, is a manifold or selector valve 51 having a pipe guide or aligning cone 52 secured to the upper end thereof. For ease of construction the manifold or selector valve 51 is preferably made up of a series of spool pieces 53, 54, 54a, 55, 56 and 57. The selector valve 51 itself will be described in greater detail with regard to FIGURES 2 through 6. While only three hydraulic pressure lines 24 have been shown in FIGURE 1, each of these three pressure lines 24 may actually comprise a series of from 1 to 10 separate flexible hydraulic lines adapted to furnish power to various components of the wellhead assembly. Preferably a series of several flexible lines are grouped together in a bundle, as illustrated at 24, so as to protect them more readily. The three groups of hydraulic pressure lines 24 terminate in a fitting 58 from which the individual lines 59 may be run to the various inlet ports of the spool pieces 54, 54a, 55, 56 and 56a, of the manifold valve 51. Two groups of pressure lines are in communication between the individual spool pieces of the manifold valve 51 and the various components of the wellhead assembly that are hydraulically actuated. In this particular case the pressure lines 61 convey pressure fluid to one side of a ram or a gate to operate it in one direction, while pressure conduits 60 either return fluid from the opposite side of the ram or gate or furnish power fluid thereto to operate it in the opposite direction.

Lowerable through the water from the barge 11 alongside the marine conductor pipe 23 is a guide frame 62 provided with guide arms 63 and guide cones 63a which are slidable along the guide lines 22 into position within the guide columns 36. Fixedly secured to the guide frames 62 is a downward extending small diameter pipe or stinger 64, the lower end of which is adapted to seat in the top of manifold valve 51. The guide frame 62 and stinger 64 are lowerable in any suitable manner, as by means of a wire line, or by means of a small diameter pipe string or a flexible tubing in the event that a flexible pipe 65 be used such, for example, as rubber hose. It is necessary that the guide frame 62 and stinger 64 be of sufficient weight to stab into the top of the manifold valve 51, and actuate the valve. The stinger 64 is positioned on the guide frame 62 so that it is in vertical alignment with the manifold valve 51 when it is lowered into place.

Figure 2:
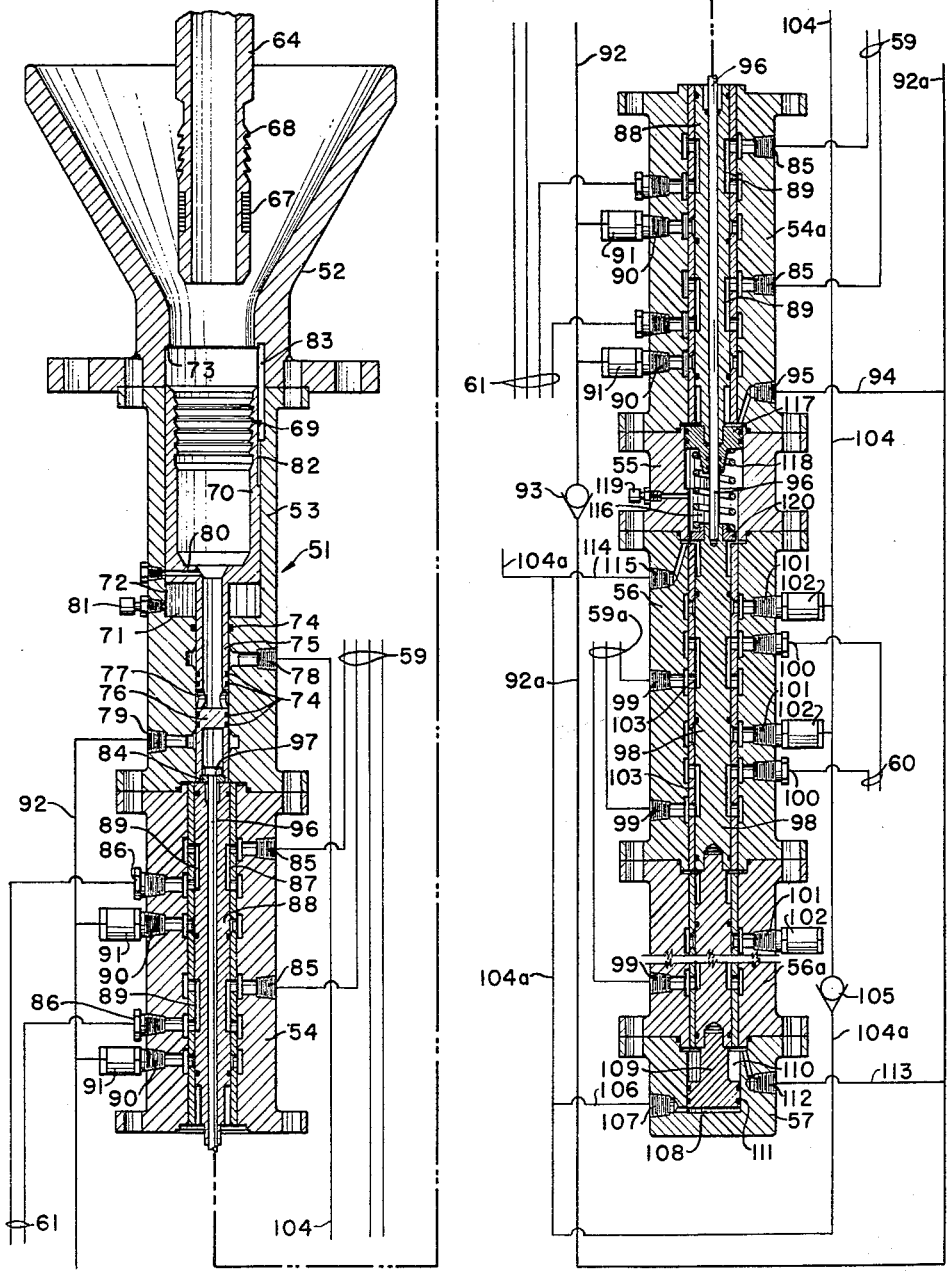

One form of the manifold valve 51 of FIGURE 1 is shown in greater detail in FIGURE 2 of the drawing. In this figure, the lower end of the stinger 64 is shown as being preferably provided with suitable annular packing 67 and any suitable type of stinger locking device 68 which may be in the form of a series of threads or grooves which cooperate with a mating portion 69 on the inner wall of a sleeve 70. The sleeve 70 is mounted for limited sliding movement within the valve housing spool 53 between the bottom 71 of the recess 72 and a shoulder 73 formed at the upper end of the valve housing. Ring packings 74, such as O-ring seals, may be employed to provide a fluidtight seal between the housing spool piece 53 and a small-diameter downwardly-extending portion 75 of the sleeve 70. This downwardly extending portion 75 from the sleeve 70 is closed near its lower end, as at 76, and is provided with transverse port means 77 extending diametrically through the walls of the sleeve portion 75. Thus, the lower portion 75 of the sleeve 70 forms a sleeve valve which, in its normally neutral position, as illustrated, effectively closes ports 78 and 79 through the wall of the valve housing spool piece 53. The sleeve 70 and its downwardly-extending portion 75 are normally secured, in a neutral inoperative position so as to close ports 78 and 79, by means of a shear pin 80 which extends through the wall of the spool piece 53 and into the sleeve 70. A grease fitting 81 may be provided whereby grease may be injected into the recess 72 and thence downwardly and upwardly into various parts of the manifold valve to inhibit corrosion of the valve.

The upper end of the sleeve 70 is provided with suitable means such as a keyway 82 in which a key 83 is positioned for longitudinal sliding movement, the key 83 being fixedly secured to the manifold housing 53, or to the aligning cone 52 to prevent rotation of the sleeve 70 within the housing 53. This is necessary so that port 77 in the sleeve valve is in register with the ports 78 and 79 when the sleeve valve 70—75 is shifted in one direction or the other. Formed on the lower end of the downwardly-extending portion 75 of the sleeve 70 is an inwardly-extending shoulder 84. Port 77 is omni-directional because of the annular grooves in housing 53. The key is necessary only because of the mechanical nature of the latch between stab tool 64 and sleeve 70. Downward force only is required to set latch. Right-hand rotation is required to release the latch.

The spool pieces 54 and 54a forming the manifold valve housing below the spool piece 53 are provided with a series of fluid ports 85 on one side of the spool pieces and fluid ports 86 on another side of the spool pieces.

If desired, the spool pieces may be provided with a tubular liner 87 having an elongated piston valve 88 mounted for sliding axial movement therein. The piston valve 88 is provided with a series of annular flow passageways 89 formed in the outer surface of said piston valve for bringing ports 85 and 86 into open communication in one position of the valve 88, as illustrated in FIGURE 2. The spool pieces 54 and 54a are also provided with another series of fluid ports 90, preferably positioned adjacent ports 86 so as to be brought into open communication with ports 85 through flow passageways 89 upon movement of the piston valve 88 downwardly to the position shown in FIGURE 3. The ports 90 are connected through suitable unidirectional flow devices, such as check valves 91, to a common pipe or conduit 92 which is in open communication with port 79 in the upper spool piece of the manifold valve. The conduit extending downwardly from check valve 91 is provided with check valve 93, and changes to conduit 92a. On the other side of check valve 93 the conduit 92a, after being connected through a side conduit 94 with a port 95 in spool piece 54a of the manifold valve, continues upwardly to the surface of the water, through a line in the hose bundle 24, where it is connected to the hydraulic pressure source.

The ports 86 in the spool pieces 54 and 54a of the manifold valve housing are connected through conduits 61 with the various hydraulically-operated components 27 and 28 on the wellhead, as described hereinabove with regard to FIGURE 1.

Axially positioned within the bore of the piston valve 88 is a rod 96 having a head 97 of enlarged diameter positioned above the shoulder 84 on the bottom of the downwardly-extending portion 75 of the sleeve 70. The rod 96 extends downwardly through the entire piston valve 88 and has a second piston valve 98 connected to its lower end. The lower piston valve 98 is positioned within the spool pieces 56 and 56a of the manifold valve 51. The spool pieces 56 and 56a of the manifold valve are similar to the spool pieces 54 and 54a located thereabove, being provided with ports 99 similar to ports 85, ports 100 similar to ports 86, ports 101 similar to ports 90, with ports 101 being closed to flow in one direction by check valves 102. Likewise, the ports 99 are normally connected through conduits 59a to a source of hydraulic pressure at the surface of the water, while ports 100 are connected through hydraulic pressure conduits 60 to the hydraulically-operated components on the wellhead, the conduits 60 being connected so as to handle the return fluid from the hydraulically operated components, or the fluid on one side of the movable elements of said hydraulically operated units.

In a like manner, the piston 98 is provided with flow passageways 103 of a like length and design sufficient to put fluid ports 99 in open communication with ports 100 in the normal inoperative position of the piston valve 98 while placing ports 99 in communication with ports 101 when the piston valve 98 has been shifted to its other extreme position. The ports 101 are connected through check valves 102 to a common pipe 104 which is in open communication at all times with port 78 through the well of spool piece 53 at the top of the manifold valve. Going in the opposite direction, conduit 104 is provided with a check valve 105, changes to conduit 104a, and then is connected through bypass line 106 to port 107 which leads to a space 108 below a piston 109 fixedly secured to the bottom of the piston valve 98 for a limited movement within a piston chamber 110 formed in section 57 of the manifold valve. If desired, the piston 109 may be provided with O-ring seals 111. The other end of the space 110, within which the piston 109 reciprocates, is connected through port 112 and a conduit 113 to conduit 92a which extends upwardly to the surface and is connected to the source of hydraulic pressure.

Conduit 104a is also connected through the conduit 114 to a fluid port 115 which is in communication with the lower end of a space or cylinder 116 in which a piston 117 is mounted for coaxial movement around rod 96 but independent thereof. The piston 117 is fixedly secured to the lower end of the piston valve 88 and is movable therewith. The piston 117 is normally positioned at the top of the cylinder or space 116 by means of a compression spring 118. A grease fitting 119 is provided whereby grease may be injected into the space 116 of the manifold valve. The upper end of the space 116 is in communication through ports 95 and conduits 94 with conduit 92a which is connected to a pressure fluid source. Instead of using a shear pin 80 to position the sleeve 70 within the spool 93 at the top of the manifold valve, it is realized that compression springs may be positioned above and below the sleeve 70 to maintain it in a neutral position, if desired.

In the normal operation of the equipment shown in FIGURE 1, hydraulic pressure fluid is supplied through the several individual conduits in the bundles of conduits 24 to operate the various hydraulically-operated components of the wellhead assembly. With all of the hydraulic pressure conduits in lines 24 in good working order for conveying and returning hydraulic pressure fluid to and from the source of pressure fluid on the drilling barge 11 to the various hydraulically-operated components of the wellhead structure at the ocean floor, the manifold valve 51 of FIGURE 1 assumes the position illustrated in FIGURE 2. Thus, the hydraulic pressure operating fluid passes down through conduits 59, through ports 85, around the annular passageways 89 to be discharged through ports 86, and thence through conduits 61 to convey hydraulic pressure fluid to the various hydraulically-operated components. Thus, for example, hydraulic pressure fluid is conveyed through one of the conduits 61 to actuate the rams within the blowout preventer 28 (FIGURE 1) and to close the rams against a pipe which may be within the blowout preventer. While the rams are being closed by applying hydraulic pressure fluid through conduits 61 to one side of the rams, pressure fluid from the opposite sides of the rams is returned through pressure conduits 60 through ports 100, around annular flow passageway 103, and thence out of ports 99, and up the conduits 59a to the surface of the water where the fluid is returned to the reservoir of the hydraulic system. At this time the upper and lower piston valves 88 and 98 are maintained in their neutral positions by means of the compression spring 118 between them. The lower end of the spring 118 bears against a spring seat 120 which is fixedly secured to the top of the piston valve 98. At the same time no fluid passes down conduits 92 and 104 since ports 78 and 79 are closed by the lower end 75 of the sleeve 70 which is fixedly positioned by shear pin 80.

For purposes of illustrating the method and apparatus of the present invention it will be assumed that one or more of the hydraulic pressure fluid conduits in the conduit bundles 24 has been ruptured so that control of one or more of the hydraulically-operated components on the wellhead at the ocean floor has been lost. In order to regain control of the hydraulically-operated components on the wellhead, the stinger frame 62 carrying the stinger 64 is lowered on the guide lines 22 by means of a pipe string or a flexible conduit 65 of small diameter. The stinger 64 and its frame 62 are self-aligning to a position shown in FIGURE 1 with the stinger 64 being directly over the guide cone 52 of the manifold valve 51. Further lowering of the stinger 64 causes the lower end of the stinger to contact the sleeve 70, forcing it downwardly to a position shown in FIGURE 3 of the drawings. At this point the shear pin 80 has been broken and the sleeve 70 and piston valve 88 have been forced to their lowermost position, compressing spring 118 while the lowermost piston valve 98 remains in its normal position. Assuming that one of the hydraulic pressure conduits 59 has been ruptured, hydraulic pressure fluid may be pumped down through the auxiliary pipe 65 and stinger 64 through the port 77 in the lower portions 75 of the sleeve 70, the fluid being discharged out port 79. From port 79 the flow of fluid is down conduit 92. Since check valve 93 prevents fluid from being pumped below this point, the pressure fluid is forced through the check valves 91, up annular space 89 and out ports 86. From port 86 hydraulic pressure fluid is pumped simultaneously down through the conduits 61 to supply once again operating pressure fluid to the hydraulically-operated components of the wellhead assembly. In the event that it is desired to operate one hydraulically-operated component in sequence the check valves 91 could be sequence valves that are set to operate at varying pressures.

With auxiliary pressure fluid being supplied to the hydraulically-operated components to operate them, return fluid from the same components is returned in a manner as previously described with regard to FIGURE 2, that is, up through conduits 60, in ports 100, around annular passageways 103, out ports 99, and thence upwardly through conduits 59a. In the event that the conduits 59a running to the surface are not damaged, the pressure fluid would return to the reservoir of the hydraulic system on the barge. If, on the other hand, the conduits 59a were ruptured, the returning fluid from the other side of the hydraulically-operated components would merely drain to the ocean but would not hinder the operation of the hydraulically-operated unit to which pressure was being applied through conduits 61.

Thus, in its simplest form, the manifold valve of the present invention may merely comprise spool pieces 53, 54, 54a and 55 with the sleeve 70 and piston valve 88 contained therein to provide sufficient structure for accomplishing the purpose for which the system was designed, that is, of applying auxiliary hydraulic pressure fluid to the system to actuate hydraulically-operated components in the system in one direction. In this case, fluid being pumped down through conduits 61 would have to unlock the hydraulically-operated units from the system or open them so that they or the entire wellhead structure could be raised to the surface for replacement or repair. If the valve is operated in this manner on the equipment designed in this manner, there is no need to be concerned with the return flow of hydraulic pressure fluid from the other side of the hydraulically-operated components.

However, it is preferred that the rod 96 be incorporated in the present manifold valve so as to provide means for supplying hydraulic pressure fluid in one direction or the other to the hydraulically-operated components on the wellhead assembly. It has been previously described with regard to FIGURE 3 that the operation of pumping hydraulic fluid through stinger 64 and down through conduit 61 to one side of the units to be operated. If on the other hand, it is desired to pump hydraulic pressure fluid in the opposite direction, that is, to the opposite side of the units to be operated, it is only necessary to pick up slightly on the stinger frame so that the stinger 64, in mechanical or frictional engagement with the sleeve 70, raises the sleeve 70 to the uppermost shoulder 73 after the sheer pin 80 has been sheared.

Figure 4:
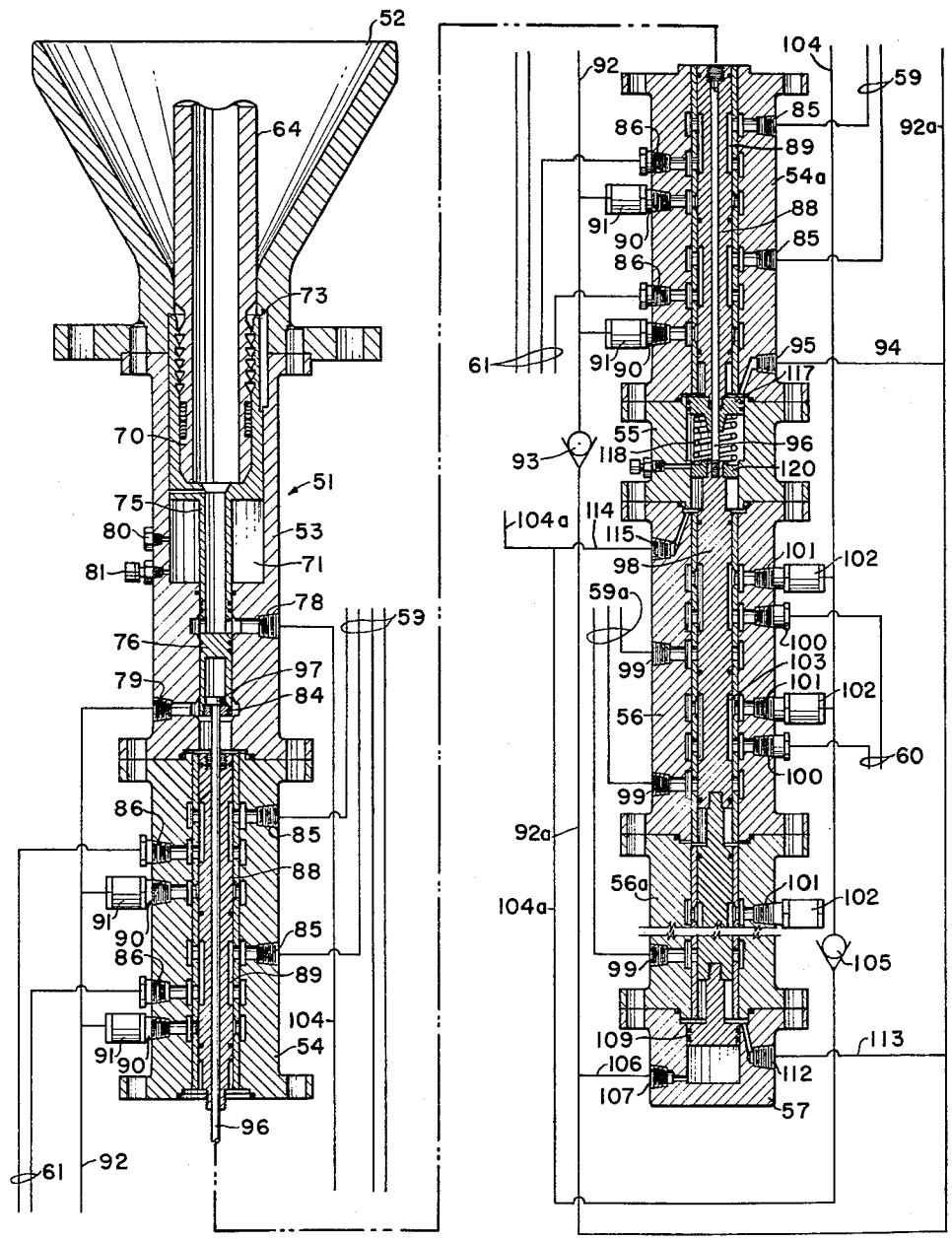

With the sleeve 70 in this position, as illustrated in FIGURE 4, hydraulic pressure fluid being pumped down through the stinger 64 is discharged outwardly through port 78 and thence downwardly though conduit 104. Since the check valve 105 limits the flow of fluid through conduit 104 past the check valves 102, the fluid enters through check valves 102, through ports 101, around annular flow passageways 103, to be discharged through ports 100 and thence downwardly through conduits 60 to the opposite side of the hydraulically-operated units. Return fluid from these same hydraulically-operated units would pass upwardly through conduits 61, in ports 86, around annular fluid passageways 89, thence out through ports 85 and up through conduits 59 to the surface of the water. It is to be noted that upon picking up on the stinger 64, as shown in FIGURE 4, the sleeve 70 is raised so that the shoulder 84 on the lower end 75 thereof lifts the head 97 on the top of the rod upwardly to raise the lower piston valve 98 to its uppermost position. Spring 118 returns upper piston valve 88 to its normal (uppermost) position.

Figure 3:
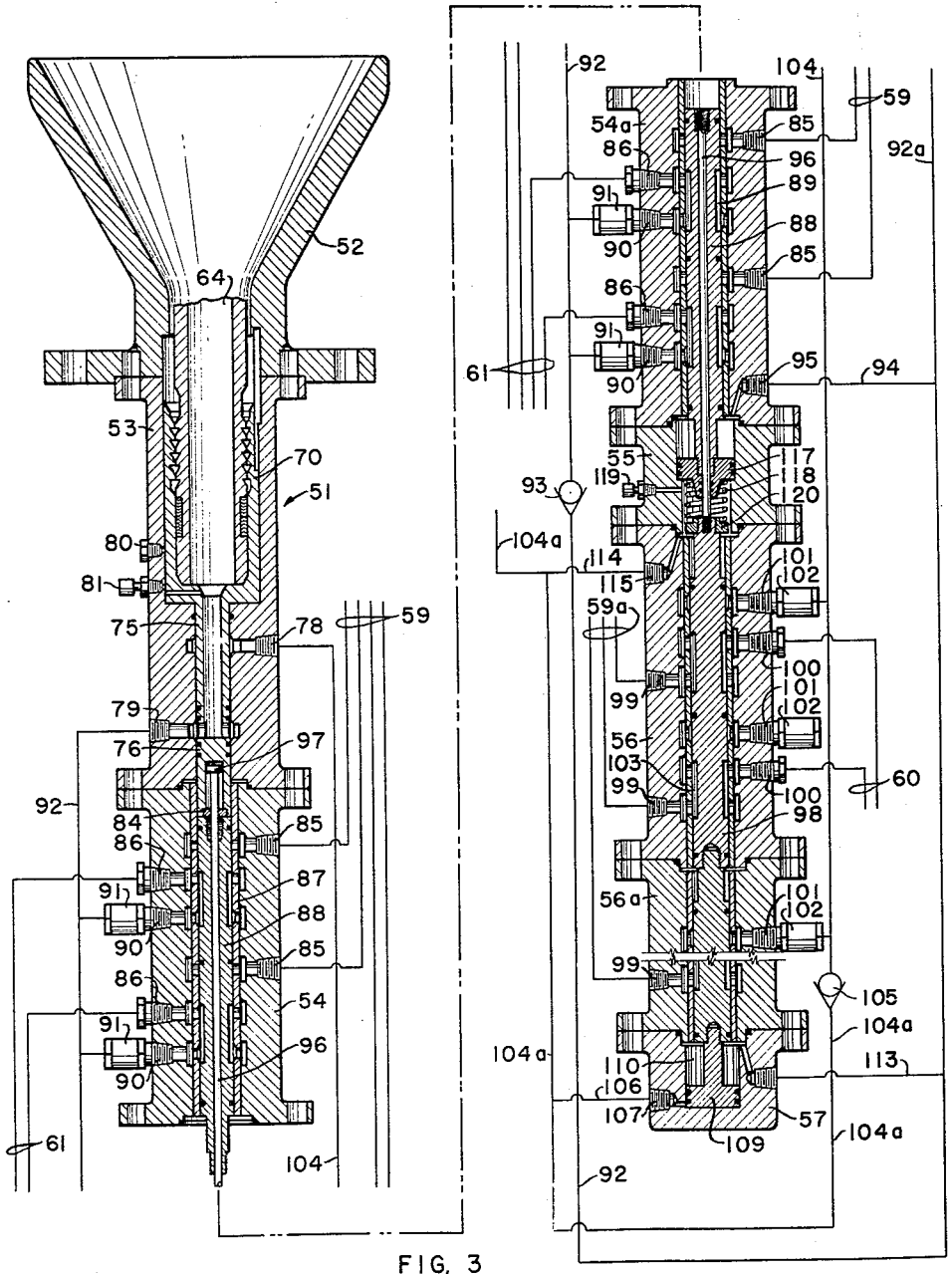
Figure 5:
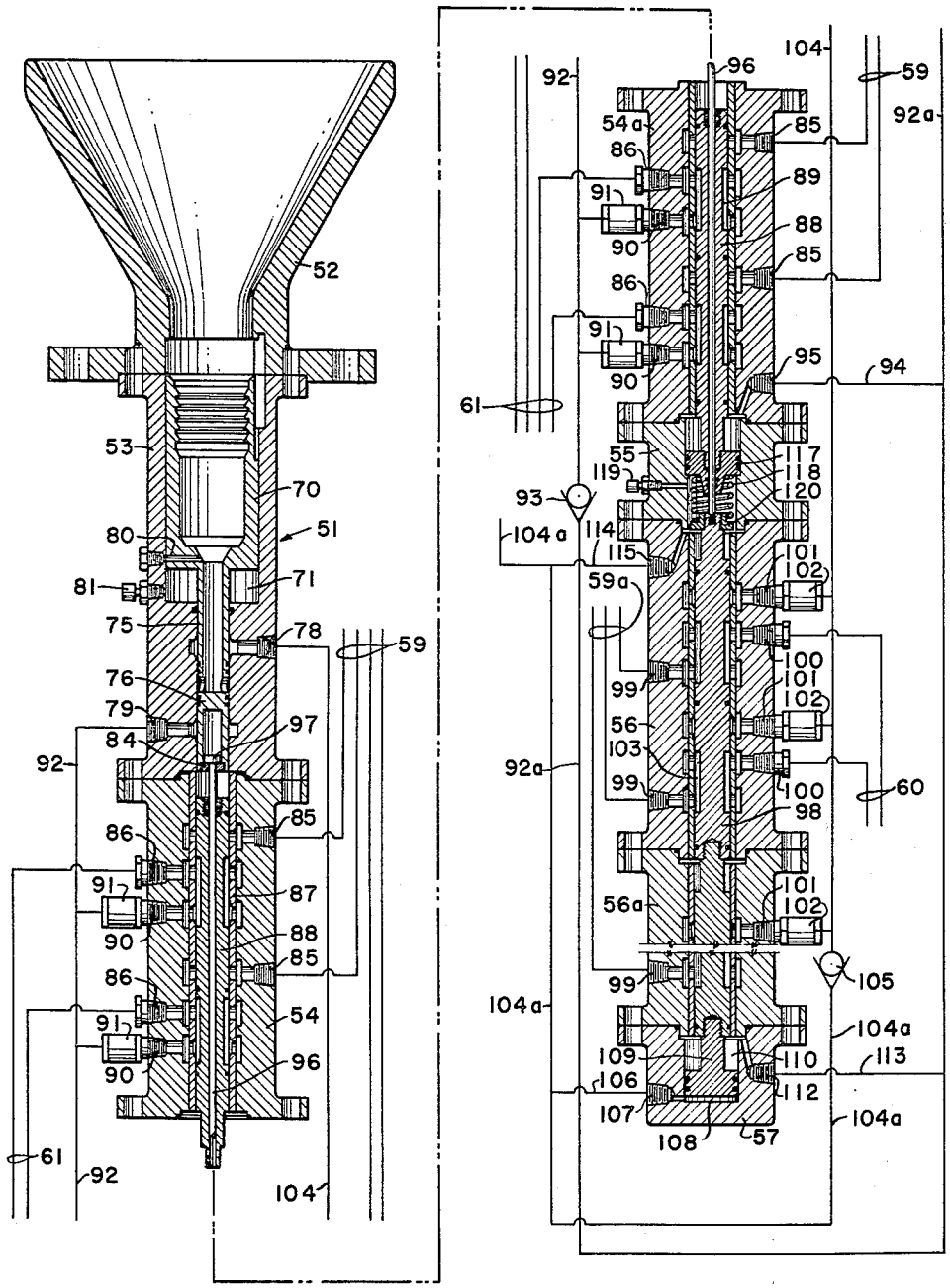
Figure 6:
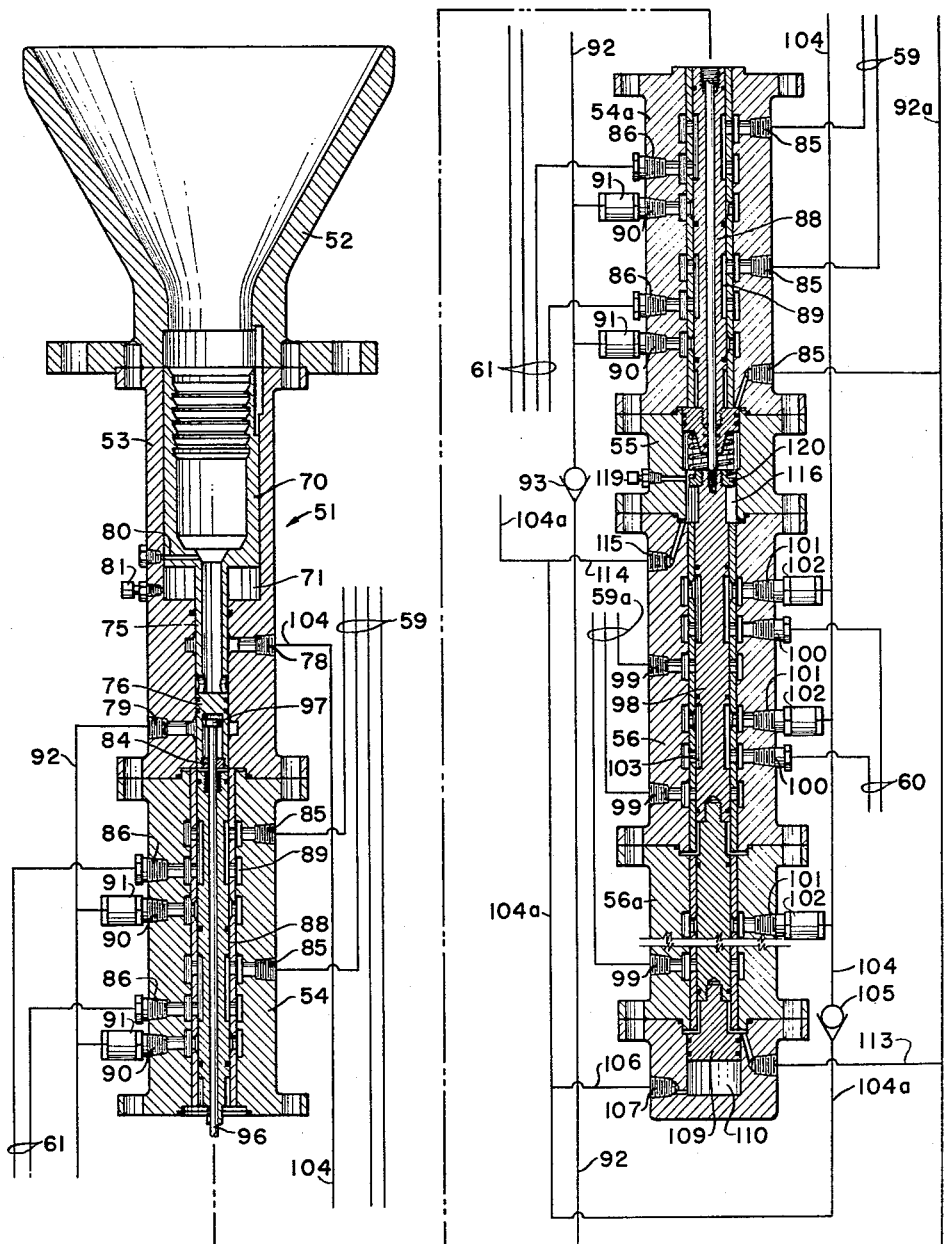

The manual operation of the manifold valve 51 of the present invention has been described hereinabove with regard to FIGURES 3 and 4 wherein the stinger 64 in its frame are lowered so as to stab into the slidable sleeve 70 which is normally fixedly positioned by means of shear pin 80. The same manifold valve is shown in FIGURES 5 and 6, but in this case the valve is operated by hydraulic pressure in one or both ways, it being assumed that there is at least one hydraulic pressure fluid line still in communication between a source of pressure fluid on the barge and the manifold valve 51 to operate the manifold valve. Since each bundle 24 of pressure lines may contain as many as 10 or more separate lines for conveying a pressure fluid down to various components of the wellhead, it is planned to have at least one line or preferably one line in each bundle connected directly to the manifold valve to operate the manifold valve. Thus, in FIGURES 5 and 6 it is assumed that at least one line, conduit 92a, is still connected between the manifold valve and a source of pressure fluid at the surface after one or more of the other pressure fluid lines has been ruptured.

During the hydraulic actuation of the manifold valve, the upper sleeve 70 remains fixedly positioned by shear pin 80 to the spool piece 53. Positioning of the piston valves 88 and 98 is accomplished by pumping the pressure fluid through conduit 92a and thence inwardly through conduits 94 and 113 to the spaces 116 and 110 above pistons 117 and 109, respectively. Application of pressure fluid in this manner above piston 117 forces the piston valve 88 (FIGURE 5) downwardly to place ports 86 and 90 in communication with each other. Thus, continued pumping of pressure fluid down through conduit 92a forces it through the check valve 93 and thence past check valves 91, through ports 90, out ports 86 and thence through conduit 61 to the hydraulically-operated units. Return fluid from these hydraulically-operated units passed up through conduits 60, in ports 100, around annular flow passageways 103, and out ports 99 and thence upwardly through conduits 59a, either to the reservoir at the surface or into the ocean in the event that these conduits 59a are ruptured. The closing of port 79 by the lower end 75 of the sleeve 70 prevents loss of pressure fluid through the top of the manifold valve.

To operate the hydraulically-operated components of the wellhead assembly in the opposite direction, a hydraulic pressure fluid is supplied downwardly through conduit 104a (FIGURE 6) and thence through conduits 114 and 106, into ports 115 and 107 to the spaces 116 and 110 below the pistons 120 and 109, respectively. This forces both the pistons 120 and 109 to their uppermost positions along with the piston valves 88 and 98, respectively. Pressure fluid then continues through conduit 104a, past check valve 105, to conduit 104, in through check valves 102 and ports 101, around annular flow passageways 103 and thence outwardly through ports 100 to be discharged through conduits 60 to the other side of the hydraulically-operated components. Return fluid from these components would pass upwardly through conduits 61, ports 86, annular passageways 89, out ports 85 and upwardly through conduits 59 to the surface, or to the ocean in the event that these conduits were ruptured.

From the above description it may be seen if any or all of the primary hydraulic control lines becomes inoperative, an auxiliary tubing string and stinger may be run on a guidance and alignment system, stabbed into the top of the selector manifold valve by personnel at a remote distance, so as to automatically latch onto and shift the position of the valve within the manifold valve, either up or downwardly, as desired so as to enable the pumping of the hydraulic pressure fluid through this auxiliary string and manifold valve to re-establish control of the hydraulically-operated components of the wellhead. These same functions can also be performed by pumping fluid through auxiliary hoses, as described with regard to FIGURES 5 and 6.

The two small pistons 109 and 117 serve no function in the mechanical operation of this valve. They are in use only when the valve is operated hydraulically as illustrated in FIGURE 5 and FIGURE 6. In the normal operating position upper piston valve 88 is in its uppermost position and lower piston valve is in its lowermost position. (Spring 118 holds piston valves 88 and 98 in their normal operating positions.) Flow pressure applied ports 95 and 112 shift only upper piston valve 88 to its lowermost position to permit opening of all rams in preventers 27 and 28. (Flow pressure in port 112 serves no function at this time.) When fluid pressure at ports 95 and 112 is relieved upper piston valve 88 returns to its normal (up) position. Fluid pressure applied to ports 107 and 115 shift only lower piston to its uppermost position to permit closing of the blowout preventer 26 and one set of rams in preventer 28. (Fluid pressure in port 115 serves no function at this time.) Rod 96 serves no purpose in the hydraulic system.

We claim as our invention:

1. A hydraulic system comprising a plurality of hydraulically-operated units, a source of hydraulic pressure fluid, first conduit means interconnecting said hydraulically-operated units with said pressure source, normally open valve means in said first conduit at a point adjacent to said hydraulically-operated units for controlling the flow of hydraulic pressure fluid thereto, inlet port means in said valve means for receiving the open end of auxiliary hydraulic pressure conduit means adapted to be inserted in said valve means remotely, and auxiliary hydraulic pressure conduit means remotely insertable in said inlet port means in communication between said valve means and said fluid pressure source for bypassing said first conduit means leading to said valve means with a pressure fluid to energize said hydraulically-operated units and to operate said valve means.

2. A hydraulic system comprising a plurality of hydraulically-operated units, a source of hydraulic pressure fluid, first conduit means interconnecting said hydraulically-operated units with said pressure source, normally open valve means in said first conduit means at a point adjacent to said hydraulically-operated units for controlling the flow of hydraulic pressure fluid thereto, inlet port means in said valve means for receiving the open end of auxiliary hydraulic pressure conduit means adapted to be inserted in said valve means remotely, auxiliary hydraulic pressure conduit means remotely connectable to said inlet port means in communication between said valve means and said fluid pressure source for bypassing said first conduit means leading to said valve means with a pressure fluid to energize said hydraulically-operated units and to operate said valve means, and a sliding valve in said valve means positionable by fluid pressure from said auxiliary pressure fluid conduit means to admit pressure fluid therefrom to said hydraulically-operated units while simultaneously closing said first conduit means.

3. A three-way hydraulically-operated manifold valve for use in shutting off first conduit means upon at least partial failure thereof between a source of pressure fluid and hydraulically-operated units, and operatively connecting said source of pressure fluid to said hydraulically-operated units through auxiliary bypass conduit means, said manifold valve comprising a valve housing, first and second fluid inlet port means through the side wall of said valve housing, third fluid inlet port means through one end of said housing, first and second fluid outlet port means through the side wall of said valve housing, slide valve means positioned within said housing and cooperating with the port means thereof, said slide valve being normally positioned so that said first inlet and first outlet port means are in open communication, said slide valve being positionable to a second position to close said first inlet port means and place said third inlet port means in communication through said second outlet port means and said second inlet port means with said first outlet port means.

4. A three-way hydraulically-operated manifold valve for use in shutting off first conduit means upon at least partial failure thereof between a source of pressure fluid and hydraulically-operated units, and operatively connecting said source of pressure fluid to said hydraulically-operated units through auxiliary bypass conduit means, said manifold valve comprising a pair of valve housings, first and second fluid inlet port means to each housing, first fluid outlet port means from each housing, a slide valve positioned within each housing and cooperating with the port means thereof, each slide valve being normally positioned so that said first inlet and first outlet port means are in open communication, each slide valve being positionable to a second position to close said first inlet port means and place said second inlet port means in communication with said first outlet port means, auxiliary fluid inlet port means into one end of said manifold valve coaxial with the housings thereof, second outlet port means in said manifold valve in communication in said second position with the second inlet port means of one of said housings, third outlet port means in said manifold valve in communication in a third position with the second inlet port means of the other of said housings, and a sleeve valve normally closing said second and third outlet port means of said manifold valve, said sleeve valve being mounted for sliding movement to selectively open one of said outlet port means of said manifold valve at a time, said sleeve valve being operatively connected to said slide valves in said housing to position one slide valve independent of the other.

References Cited in the file of this patent
UNITED STATES PATENTS

| | | |
|---|---|---|
| 2,392,504 | Readman et al. | Jan. 8, 1946 |
| 2,577,462 | Hackney | Dec. 4, 1951 |
| 2,868,217 | Faisandier | Jan. 13, 1959 |